(12) United States Patent
Varanasi et al.

(10) Patent No.: US 8,158,262 B2
(45) Date of Patent: Apr. 17, 2012

(54) GLASS ARTICLE HAVING A ZINC OXIDE COATING AND METHOD FOR MAKING SAME

(75) Inventors: Srikanth Varanasi, Ottawa Hills, OH (US); David A. Strickler, Toledo, OH (US)

(73) Assignees: Pilkington Group Limited, Merseyside (GB); Arkema, Inc., Philadelphia, PA (US)

( * ) Notice: Subject to any disclaimer, the term of this patent is extended or adjusted under 35 U.S.C. 154(b) by 436 days.

(21) Appl. No.: 11/809,951

(22) Filed: Jun. 4, 2007

(65) Prior Publication Data

US 2007/0281168 A1 Dec. 6, 2007

Related U.S. Application Data

(60) Provisional application No. 60/811,048, filed on Jun. 5, 2006.

(51) Int. Cl.
*B32B 17/06* (2006.01)

(52) U.S. Cl. ........ 428/432; 428/689; 428/697; 428/699; 428/701; 428/702

(58) Field of Classification Search .................. None
See application file for complete search history.

(56) References Cited

U.S. PATENT DOCUMENTS

| | | | |
|---|---|---|---|
| 4,751,149 A | 6/1988 | Vijaykumar et al. | |
| 5,401,305 A | 3/1995 | Russo et al. | |
| 5,897,957 A | * 4/1999 | Goodman | 428/432 |
| 6,071,561 A | 6/2000 | Gordon et al. | |
| 6,416,814 B1 | 7/2002 | Giolando | |
| 6,627,765 B2 | 9/2003 | Giolando | |
| 6,858,306 B1 | 2/2005 | Strickler et al. | |
| 7,507,357 B2 | 3/2009 | Abe et al. | |

FOREIGN PATENT DOCUMENTS

| | | |
|---|---|---|
| EP | 1 362 834 A | 11/2003 |
| EP | 1416541 | 6/2004 |
| FR | 2 670 200 A | 6/1992 |
| GB | 2324098 | 10/1998 |
| RU | 2274616 | 1/1998 |
| WO | WO-03/093185 | * 11/2003 |
| WO | WO 2007/029014 A | 3/2007 |

OTHER PUBLICATIONS

Park et al, Japanese Journal of Applied Physics, vol. 44, No. 11, 2205, pp. 88027-88031.

Singh et al, Journal of Indian Institute of Science, vol. 81, Sep.-Oct. 2001, pp. 527-533.

Das and Ray, Journal of Physics D: Applied Physics, vol. 36, 2003, p. 152-5.

Choi, et al, Thin Solid Films, vol. 192-4, pp. 712-720.

* cited by examiner

*Primary Examiner* — Ling Xu
(74) *Attorney, Agent, or Firm* — Marshall & Melhorn, LLC

(57) ABSTRACT

A multi-layer thin film having as a primary component, a coating of highly doped zinc oxide, and optionally, a color suppression underlayer and a protective metal oxide overcoat. The film stack is preferably deposited on a transparent substrate by atmospheric chemical vapor deposition. The film stack exhibits a desirable combination of properties including high visible light transmittance, relatively low solar energy transmittance, low emissivity, and high solar selectivity.

15 Claims, 3 Drawing Sheets

GLASS ARTICLE HAVING A ZINC OXIDE COATING AND METHOD FOR MAKING SAME

RELATED APPLICATION

This application is claiming the benefit under 35 U.S.C. 119(e) of the provisional application filed Jun. 5, 2006 under 35 U.S.C. 111(b) which was granted Ser. No. 60/811,048. This provisional application is hereby incorporated by reference.

BACKGROUND OF THE INVENTION

This invention relates to a highly doped zinc oxide coated glass article exhibiting high visible light transmittance with low total solar energy transmittance.

Coatings on architectural glass are commonly utilized to provide specific energy absorption and light transmittance properties. Additionally, coatings provide desired reflective or spectral properties that are aesthetically pleasing. The coated articles are often used singularly or in combination with other coated articles to form a glazing or window unit.

Coated glass articles may be produced "on-line" by continuously coating a glass substrate while it is being manufactured in a process known in the art as the "float glass process." Additionally, coated glass articles are produced "off-line" through a sputtering process. The former process involves casting glass onto a molten tin bath which is suitably enclosed, thereafter transferring the glass, after it is sufficiently cooled, to lift out rolls which are aligned with the bath, and finally cooling the glass as it advances across the rolls, initially through a lehr, and thereafter, while exposed to the ambient atmosphere. A non-oxidizing atmosphere is maintained in the float portion of the process, while the glass is in contact with the molten tin bath, to prevent oxidation of tin. An oxidizing atmosphere is maintained in the lehr. In general, the coatings are applied onto the glass substrate in the float bath of the float bath process. However, coatings may also be applied onto the substrate in the lehr.

The attributes of the resulting coated glass substrate are dependent upon the specific coatings applied during the float glass process or an off-line sputtering process. The coating compositions and thicknesses impart energy absorption and light transmittance properties within the coated article while also affecting the spectral properties. Desired attributes may be obtainable by adjusting the compositions or thicknesses of the coating layer or layers. However, adjustments to enhance a specific property can adversely impact other transmittance or spectral properties of the coated glass article. Obtaining desired spectral properties is often difficult when trying to combine specific energy absorption and light transmittance properties in a coated glass article. It is also difficult to obtain useful film thicknesses as the available deposition time in on-line processes is mere seconds, as the continuous glass ribbon is moving at a speed of several hundred inches per minute.

Deposition of zinc oxide coatings is known from the patent literature.

U.S. Pat. No. 4,751,149 describes a method of applying a zinc oxide coating to substrate at a low temperature by using a mixture of an organozinc compound and water carried in an inert gas. The resulting zinc oxide film is said to have relatively low resistivity which can be varied by addition of a Group III element.

U.S. Pat. No. 4,990,286 describes zinc oxy-fluoride films produced by CVD from vapor mixtures of zinc, oxygen and fluorine-containing compounds. Electrical conductivity of the film is said to be increased by substituting fluorine from some of the oxygen in the zinc oxide. The resulting films are said to be transparent, electrically conductive and infrared reflecting.

U.S. Pat. No. 6,071,561 describes a method of depositing fluorine-doped zinc oxide films utilizing vaporized precursor compounds such as a chelate of dialkylzinc, more specifically utilizing an amine chelate, an oxygen source and a fluorine source. The coatings produced are said to be electrically conductive, IR reflective, UV absorbing and free of carbon.

U.S. Pat. No. 6,416,814 describes the utilization of ligated compounds of tin, titanium and zinc as CVD precursor compounds to form metal oxide coatings on heated substrates.

U.S. Pat. No. 6,858,306 describes a glass substrate having disposed thereon a multi-layer coating of an antimony doped tin oxide, and a coating of fluorine doped tin oxide. The glass substrate so coated exhibits low emittance and high solar selectivity, thus providing improved heat rejection in summer and heat retention in winter while still permitting the transmittance of a relatively high degree of visible light.

Deposition of highly doped zinc oxide has been reported in the scientific literature for use in, for example, solar cells. Some examples of such articles follow:

Park et al. report deposition of highly doped ZnO films via pulsed laser deposition (see Japanese Journal of Applied Physics, Vol. 44, No. 11, 2205, pp. 88027-31). Using aluminum as the dopant, samples with an electron concentration of $1.25 \times 10^{21}$ cm$^{-3}$ and an electron mobility of 37.6 cm$^2$N-s were said to have been produced. The investigators state that doped zinc oxide films can be used as transparent contacts in solar cells, laser diodes, ultra-violet lasers, thin film resistors, flat panel displays, and organic light-emitting diodes.

Similarly, Singh et al. (Journal of Indian Institute of Science, Vol. 81, September-October 2001, pp. 527-533) describe deposition of highly doped ZnO by pulsed laser ablation. Using a zinc oxide target doped with 2% aluminum oxide, ZnO:Al samples with an electron concentration of $1.5 \times 10^{21}$ cm$^{-3}$ and an electron mobility of 29 cm$^{-3}$/V-s were said to have been produced.

Das and Ray deposited aluminum doped zinc oxide films by rf-magnetron sputtering, the films obtained were said to exhibit an electron concentration of $2.3 \times 10^{21}$ cm$^{-3}$. (*Journal of Physics D: Applied Physics*, Vol. 36, 2003, pp. 152-5.)

Finally, Choi et al. deposited gallium doped zinc oxide by rf-magnetron sputtering and claims to have produced films exhibiting an electron concentration of $1.5 \times 10^{21}$ cm$^{-3}$. (*Thin Solid Films*, Vol. 192-4, 1990, pp. 712-720.)

It would be advantageous to provide a coated glass article having a neutral tint that rejects solar energy in the summer and provides a low U value for the winter. A solar reducing glazing with a low emittance, and a low total solar energy transmittance, would significantly improve energy costs in buildings and homes while providing a desirable neutral tint.

It would also be advantageous to provide a solar reducing glazing that has a neutral color in reflectance, a low emittance, a high visible light transmittance, and a low total solar energy transmittance. The use of such a neutral colored article in architectural glazings would permit the transmission of a high degree of visible light while rejecting a significant amount of near infrared energy. Furthermore, the low emittance characteristic of the glazing would minimize any indirect heat gain from absorption.

SUMMARY OF THE INVENTION

In accordance with the invention, there is provided a novel glass article useful for producing coated, heat reducing glass for architectural windows. The coated article includes a glass substrate having a coating of a highly doped zinc oxide deposited over the glass substrate and optionally, a protective overcoat deposited on and adhering to the surface of the coating of doped zinc oxide deposited on the heated glass substrate. Such protective overcoat may comprise any suitably durable thin film having a compatible refractive index. Examples of such protective overcoats are undoped tin oxide, silica and titanium oxide. Such protective overcoat may, optionally, be doped to render same electrically conductive. For example, tin oxide may be doped with fluorine.

The coated glass article of the invention has a selectivity of 28 or more, preferably 33 or more, the selectivity being defined as the difference between visible light transmittance (Illuminant C) and total solar energy transmittance, integrated with an air mass 1.5. The coating stack, when applied to a clear glass substrate having a nominal 6 mm thickness, has a visible light transmittance of 69% or more and a preferred total solar energy transmittance of less than 41%.

Preferably, the coated glass article includes an iridescence-suppressing interlayer deposited between the heated glass substrate and the coating of doped zinc oxide. These coatings are such as to provide a neutral color in transmittance and reflectance when applied to a clear glass substrate.

The doped zinc oxide coating in the coated glass article of the invention provides for the absorption of solar energy. While this includes the absorption of some visible light, the doped zinc oxide coating is relatively selective, absorbing more near infrared energy than visible light. The doped zinc coating thus reduces the total solar energy transmittance of the coated glass article of the invention.

A method of forming the coated glass article of the present invention is also disclosed. While atmospheric chemical vapor deposition is the preferred method of deposition, other methods may be utilized.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE INVENTION

In accordance with the invention, a coated glass article having a multilayered coating of a highly doped zinc oxide layer over which an optional protective overcoat of, for example, a substantially undoped tin oxide layer is applied, provides an article which exhibits a low emittance, a high visible light transmittance, and a reduced total solar energy transmittance. The coated glass article is especially suitable for use in architectural glazings and windows. However, the coated glass article of the present invention may also be suitable for other applications, such as vehicle windows.

The highly doped zinc oxide coating also lowers the emissivity of the coated glass article of the invention to less than 0.15, and preferably to less than 0.10. As part of an insulating glass unit, the low emittance value provides a winter time U-value of less than 0.34, and preferably less than 0.32. In addition, it has surprisingly been determined that the solar selectivity of the film stack described is more than twice that of previously known multilayer coatings having otherwise similar solar control properties.

Preferably, tin oxide or other metal oxide coating is utilized to form an overcoat to protect the somewhat mechanically and chemically fragile zinc oxide coating. The protective overcoat may slightly increase the emissivity of the coating stack. In order to minimize emissivity changes, the thickness of the protective layer is preferably less than 1000 Å. Alternatively, a protective layer consisting of tin oxide having a thickness greater than 1000 Å could be doped with fluorine, niobium, or tantalum to achieve the desired emissivity.

The specific coating stack on the glass substrate provides a neutral colored article having a high visible light transmittance, a reduced total solar energy transmittance, and a low emittance. The use of the inventive article in architectural glazings results in a glazing that rejects solar energy in the summer and provides a low U-value for the winter.

Preferably, the coated glass article includes an iridescence-suppressing interlayer deposited between the glass substrate and the coating of doped zinc oxide. The coatings are such as to provide a neutral color in transmittance and reflectance when applied to a clear glass substrate.

Figure 2:
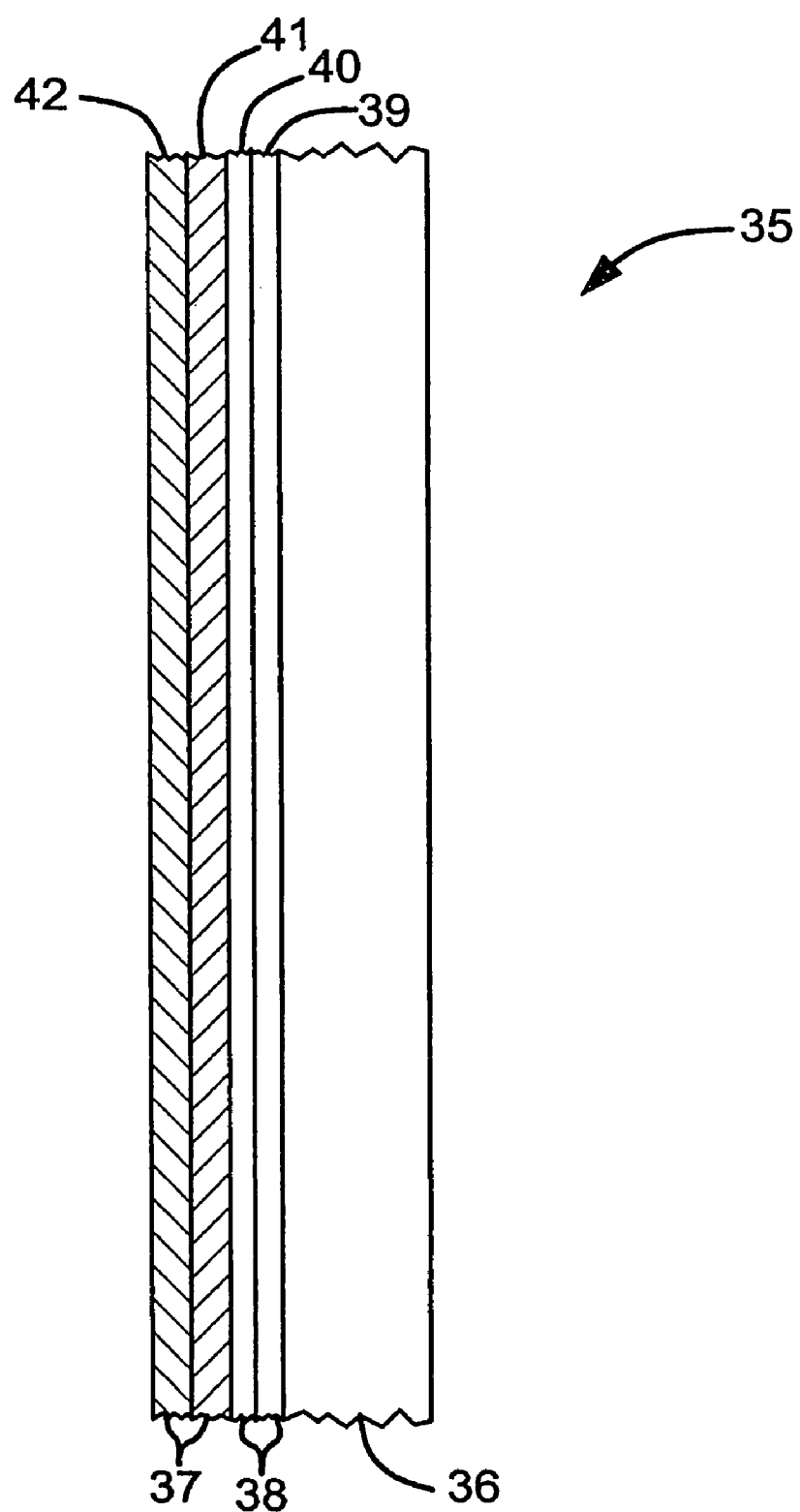
FIG. 2 is a broken sectional view of a coated glass article according to the invention.

FIG. 2 illustrates the coated glass article of the invention, indicated generally by reference numeral 35, comprising a glass substrate 36 and a multilayered coating 37 adhered to one surface thereof. In the preferred embodiment illustrated, the multilayered coating comprises an iridescence-suppressing interlayer 38, a coating of doped zinc oxide 41, and a protective outer coating 42, for example, an undoped or fluorine doped tin oxide. In the embodiment illustrated, the iridescence-suppressing interlayer 38 is specifically comprised of a tin oxide coating 39 and a silicon dioxide coating 40.

For most applications it will be preferred that the doped zinc oxide coating 41 in the coated glass article of the invention provides especially for the absorption of solar energy. While this includes the absorption of some visible light, the doped zinc oxide coating is relatively selective, absorbing more near infrared energy than visible light. The doped zinc oxide coating thus reduces the total solar energy transmittance of the coated glass article of the invention.

The highly doped zinc oxide coating 41 includes a molar ratio of dopant to zinc of between about 0.1% and 5%. Preferably, the molar ratio of dopant to zinc is between about 1% and 3%. The molar ratio will vary depending on the dopant selected from one or more of aluminum, gallium, indium and boron. Aluminum and gallium are preferred dopants. The doped zinc oxide coating 41 preferably has a free electron concentration of greater than $1.0 \times 10^{21}$ cm$^{-3}$, and more preferably has a free electron concentration greater than or equal to $1.5 \times 10^{21}$ cm$^{-3}$. The doped zinc oxide coating 41 is preferably deposited at a thickness of from about 1600 to about 9000 Angstroms, and preferably from about 1800 to about 5200 Angstroms. The most preferred coating thickness will depend on the free electron concentration in the zinc oxide coating as well as the glass thickness. As the thickness of the zinc oxide coating, doped with one or more of the previously noted dopants in the indicated molar ratio range, is increased above 9000 Angstroms, the absorption of visible light increases to the point that the visible light transmittance becomes undesirably low. However, as the thickness of the zinc oxide coating, doped in the indicated molar ratio range, is decreased below 1600 Angstroms, the total solar energy transmission becomes undesirably high.

The highly doped zinc oxide coating 41 lowers the emissivity of the coated glass article of the invention to less than 0.15, and preferably to less than 0.10. As part of an insulating glass unit, a sheet of glass coated with doped zinc oxide held in a spaced apart relationship from an uncoated sheet of clear glass by a frame member, the low emittance value provides a winter time U-value of less than 0.34, and preferably less than 0.32. In addition, it has surprisingly been determined that in accordance with the invention, the insulating glass unit exhibits solar selectivity greater than or equal to 28, and preferably greater than or equal to 33.

The optional tin oxide overcoat 42 is preferably applied at a thickness of less than 1000 Angstroms, and even more preferably at a thickness from about 200 to about 250 Angstroms.

The iridescence-suppressing interlayer 38 of the coating stack on the glass substrate 36 provides a means to reflect and refract light to interfere with the observance of iridescence. The layer specifically eliminates iridescence so that the coated article may, if desired, be neutral colored in both reflectance and transmittance. Furthermore, the interlayer suppresses the observance of off angle colors. Iridescence-suppressing coatings are conventionally known within the art. For example, U.S. Pat. Nos. 4,187,336, 4,419,386, and 4,206,252, each herein incorporated by reference, describe coating techniques suitable for suppressing interference colors. Single layer, multiple layer, or gradient layer color suppression coatings are suitable for use with the present invention.

In the two component interlayer 38 illustrated in FIG. 2, which is the preferred type of iridescence-suppressing interlayer for use in the practice of the present invention, the coating 39 deposited onto and adhering to the glass substrate has a high refractive index in the visible spectrum and is preferably tin oxide. The second coating 40, having a low refractive index, is deposited on and adheres to the first coating of the interlayer, and is preferably silicon dioxide. Generally, each coating has a thickness selected such that the interlayer forms a combined total optical thickness of about $\frac{1}{6}^{th}$ to about $\frac{1}{12}^{th}$ of a 500 nm design wavelength.

Various deposition methods may be suitable to deposit the desired zinc oxide film stack, for example, various sputtering techniques. Chemical vapor deposition (CVD) is a preferred method of deposition. Atmospheric pressure chemical vapor deposition (APCVD) is particularly preferred.

The glass substrates suitable for use in preparing the coated glass article according to the present invention may include any of the conventional glass compositions known in the art as useful for the preparation of architectural glazings. The preferred substrate is a clear float glass ribbon wherein the coatings of the present invention are applied in the heated zone of the float glass process where temperatures are in the range of 500-700° C. Additionally, tinted glass substrates may be suitable for applying the multilayered stack of the invention. However, certain tinted glass substrates may impact the spectral and energy transmittance properties of the invention.

The specific coating stack on the glass substrate provides a coated glass article having a high visible light transmittance, a reduced total solar energy transmittance, and a low emittance. The coated glass article of the invention has a selectivity of 28 or more, the selectivity being defined as the difference between visible light transmittance (Illuminant C) and a total solar energy transmittance, integrated with an air mass 1.5, on a clear glass substrate at a nominal 3 mm thickness. The selectivity is preferably 33 or more, with a preferred visible light transmittance of 73% or more and a preferred total solar energy transmittance of less than 41%. The emittance of the present inventive article is less than 0.15, and preferably less than 0.10. Emittance or emissivity is a measure of both absorption and reflectance of light at given wavelengths. It is usually represented by the formula: Emissivity=1−reflectance of the coating. The term emissivity is used to refer to emissivity values measured in the infrared range by ASTM standards. Emissivity is measured using radiometric measurements and is reported as hemispherical emissivity ($\epsilon_h$) and normal emissivity. The use of the inventive article in architectural glazings results in a glazing that rejects solar energy in the summer and provides a low U value for the winter.

The multilayered coatings of the present invention result in a coated glass article preferably exhibiting neutral color in both reflectance and transmittance. The color is defined by the composition and thickness of the various layers of the stack.

In order to most effectively achieve color neutrality, it may be desirable to vary the thickness of the tin oxide and silica layers of the iridescence-suppressing interlayer between 150 Angstroms and 350 Angstroms. It is also important that, with respect to the subject invention, color neutrality is not strictly defined by mathematical limits, but also as perceived by the human eye in viewing the reflective color and the transmitted color.

Figure 1:
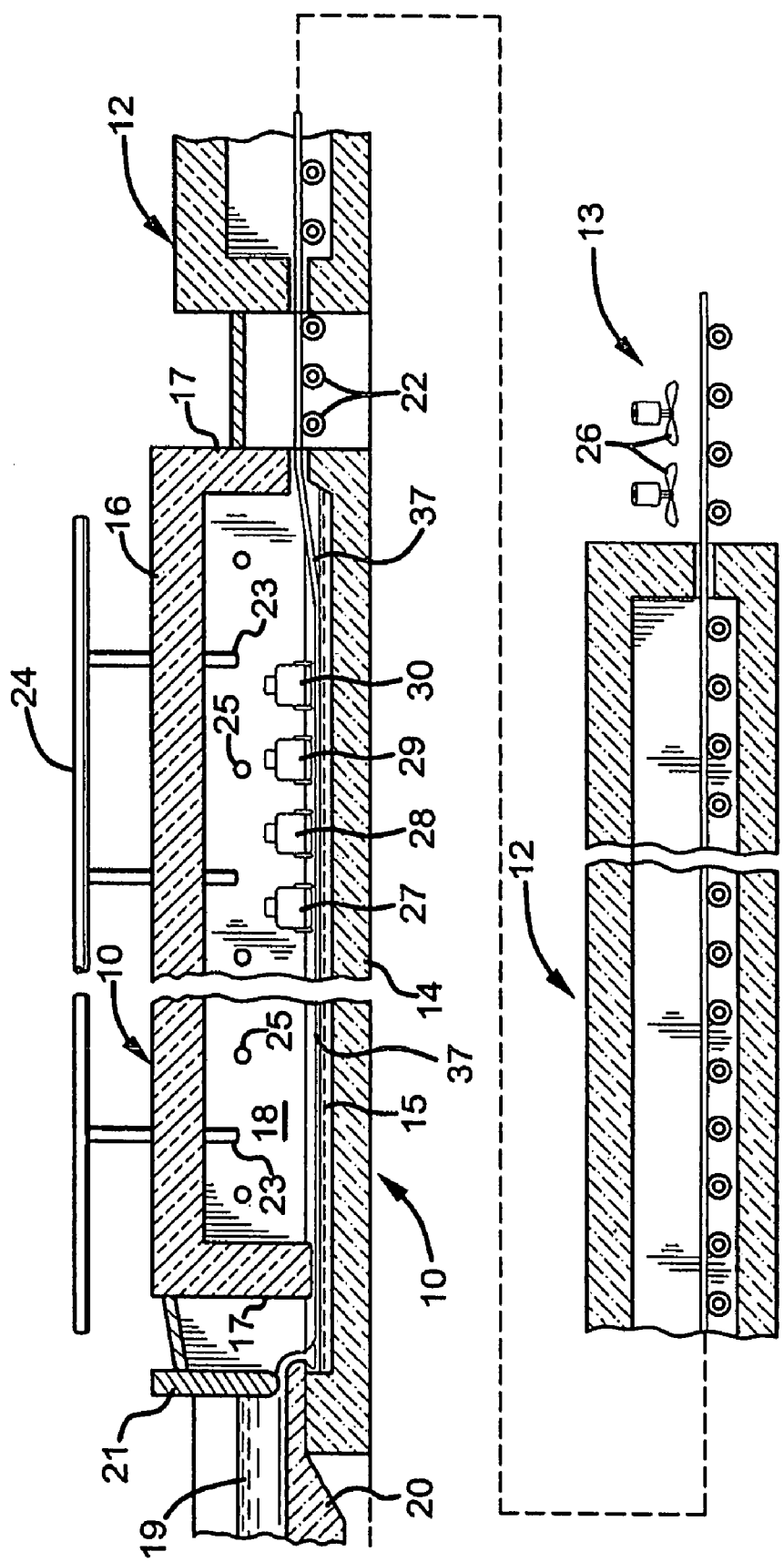
FIG. 1 is a schematic view, in vertical section, of an apparatus for practicing the float glass process, which includes four gas distributors suitably positioned in the float bath to apply coatings onto the glass substrate in accordance with the invention.

The coatings of the present invention are preferably applied "on-line" onto the glass substrate by chemical vapor deposition during the glass manufacturing process. FIG. 1 illustrates an apparatus, indicated generally at 10, useful for the on-line production of the coated glass article of the present invention, comprising a float section 11, a lehr 12, and a cooling section 13. The float section 11 has a bottom 14 which contains a molten tin bath 15, a roof 16, sidewalls (not shown), and end walls 17, which together form a seal such that there is provided an enclosed zone 18, wherein a non-oxidizing atmosphere is maintained, as hereinafter described in greater detail, to prevent oxidation of the tin bath 15. During operation of the apparatus 10, molten glass 19 is cast onto a hearth 20, and flows therefrom under a metering wall 21, then downwardly onto the surface of the tin bath 15, from which it is removed by lift-out rolls 22 and conveyed through the lehr 12, and thereafter through the cooling section 13.

A non-oxidizing atmosphere is maintained in the float section 11 by introducing a suitable gas, such as for example one composed of 99 percent by volume nitrogen and 1 percent by volume hydrogen, into the zone 18, through conduits 23 which are operably connected to a manifold 24. The non-oxidizing gas is introduced into the zone 18 from the conduits 23 at a rate sufficient to compensate for losses of the gas (some of the non-oxidizing atmosphere leaves the zone 18 by flowing under the end walls 17), and to maintain a slight positive pressure, conveniently about 0.001 to about 0.01 atmospheres above ambient pressure. The tin bath 15 and the enclosed zone 18 are heated by radiant heat directed downwardly from heaters 25. The heat zone 18 is generally maintained at a temperature of about 500-700° C. The atmosphere in the lehr 12 is typically air, and the cooling section 13 is not enclosed. Ambient air is blown onto the glass by fans 26.

The apparatus 10 also includes gas distributors 27, 28, 29 and 30 located in the float zone 11. The desired precursor mixtures for the individual coatings are supplied to the respective gas distributors, which in turn direct the precursor mixtures to the hot surface of the glass ribbon. The precursors react at the glass surface to form the desired coatings.

Figure 3:
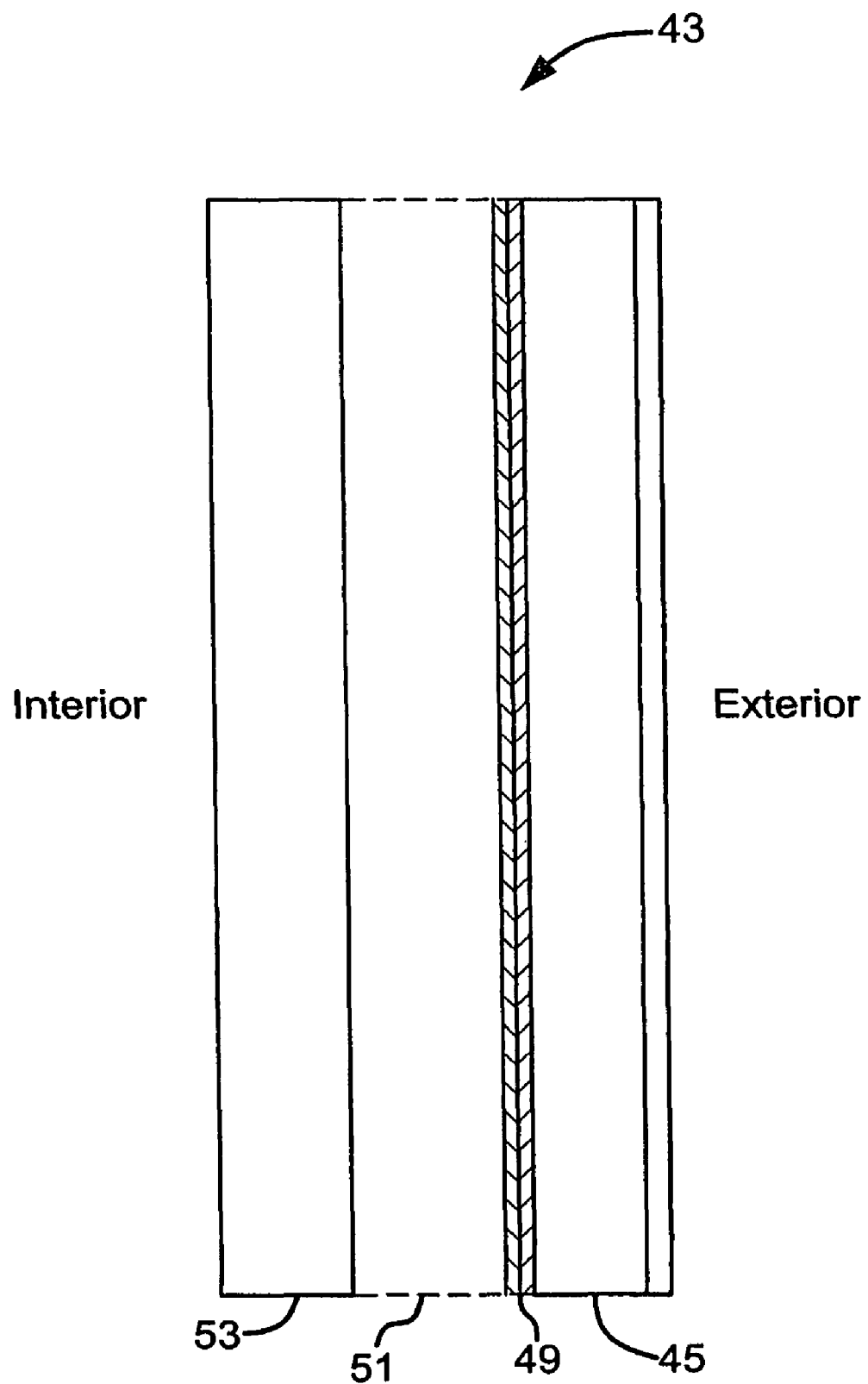
FIG. 3 is a diagram of an architectural glazing in accordance with the present invention, wherein the coated glass article is shown in an insulated glass unit as an outboard lite with the multilayer coating of the invention facing the interior.

The coated glass article of the invention is ideally suited for use in architectural glazings. For example, the coated glass article may be utilized in an insulated glass unit. Thus, the coated glass article of the present invention is illustrated in FIG. 3 as an outboard lite 45 in an insulated glass unit 43 suitable for installation into a building structure. The insulated glass unit 43 also includes an inboard lite 53 made of a glass article and maintained in a spaced apart relationship from the outboard lite 45 by a frame (not shown) in the known manner. The glass substrate 45 of the present invention is positioned facing the exterior of the structure. The multilayered coating 49 of the present invention faces the interior with an air space 51 separating the outboard lite 45 from the inboard lite 53.

When the protective overcoat is formed of fluorine doped tin oxide, the low emittance provided by the fluorine doped tin oxide improves the performance of the coated glass article in the summer and winter. The radiation energy, a component of the indirect gain from the glass to the building interior, is reduced under summer conditions with a low emittance coating. This is noticed as a reduction in the total solar heat transmittance (TSHT). TSHT is defined as including solar energy transmitted directly through the glass, and the solar energy absorbed by the glass, and subsequently convected and thermally radiated inwardly. Further, solar heat gain coefficient (SHGC) is defined as the ratio of total solar heat gain through the glass relative to the incident solar radiation. The major improvement in performance, however, occurs under winter conditions where the U-value of the glazing structure is reduced significantly with a low emittance coating. The U-value or the overall heat transfer coefficient is inversely proportional to the thermal resistance of the structure. A lower U-value means a reduction in heat loss through the glass from the interior to the exterior, resulting in savings in energy costs.

Thus, the low emittance of the coated glass article, when combined with the surprisingly selective solar absorption of the multilayer stack provides improved heat rejection in summer and heat retention in winter.

The resulting insulated glass unit, utilizing the coated glass article of the present invention, exhibits specific transmittance and spectral properties. The low emittance of surface 49 (FIG. 3) results in a U-value of less than 0.34 and preferably less than 0.32. The total solar heat transmittance of the unit is less than 41%. The insulated glass unit also exhibits a visible light transmittance (Illuminant C) of 62% or more.

The insulated glass unit preferably exhibits a neutral color in both reflectance and transmittance.

The following examples, which constitute the best mode presently contemplated for practicing the invention, are presented solely for the purpose of further illustrating and disclosing the present invention, and are not to be construed as a limitation on the invention.

Predictive Examples 1-15 and 16-23

A float glass process is used to produce a float glass ribbon having a thickness of 6 mm. During the production of the float glass ribbon, the specified coatings are modeled to be consecutively applied onto the glass substrate in the float bath through conventional chemical vapor deposition methods at the thicknesses (in Angstroms) indicated in Table 1. The precursor mixture for the various tin oxide coatings includes dimethyl tin dichloride, oxygen, water, and helium as a carrier gas. The precursor mixture for the silicon dioxide coating includes monosilane, ethylene, and oxygen and a carrier gas. The precursor mixture for the doped zinc oxide includes a Zn precursor such as diethyl zinc (DEZ), an oxygen source such as IPA (isopropanol), and a suitable aluminum precursor, for example, diethylaluminum chloride. Alternatively, a suitable gallium precursor could be substituted for the aluminum precursor. The resulting doped zinc oxide layer has a dopant concentration of about 2 atomic percent Al or Ga.

The visible light transmittance ($T_{vis}$), total solar energy transmittance ($T_{sol}$) and the solar selectivity ($T_{vis}$–$T_{sol}$) were calculated for the resulting coated glass article in each example. $T_{vis}$ and $T_{sol}$, for the noted examples, are for a monolithic glazing, i.e., a single glass sheet. The results are also shown in Table I.

TABLE I

| Ex. | Film stack | $N_e$ (cm$^{-3}$) | $\mu$ (cm$^2$/V-s) | $\epsilon_h$ | $T_{vis}$ | $T_{sol}$ | Solar Selectivity |
|---|---|---|---|---|---|---|---|
| 1 | gl/200 SiO$_2$/6900 ZnO:Al | 1.0 × 10$^{21}$ | 30 | 0.118 | 69 | 40 | 29 |
| 2 | gl/200 SiO$_2$/4340 ZnO:Al | 1.25 × 10$^{21}$ | 30 | 0.10 | 71 | 40 | 31 |
| 3 | gl/200 SiO$_2$/3250 ZnO:Al | 1.5 × 10$^{21}$ | 30 | 0.096 | 74 | 40 | 34 |
| 4 | gl/200 SiO$_2$/1875 ZnO:Al | 2.0 × 10$^{21}$ | 30 | 0.081 | 76 | 40 | 36 |
| 5 | gl/200 SiO$_2$/1575 ZnO:Al | 1.5 × 10$^{21}$ | 10 | 0.20 | 69 | 40 | 29 |
| 6 | gl/200 SiO$_2$/1960 ZnO:Al | 1.5 × 10$^{21}$ | 15 | 0.14 | 70 | 40 | 30 |
| 7 | gl/200 SiO$_2$/4300 ZnO:Al | 1.5 × 10$^{21}$ | 45 | 0.07 | 74 | 40 | 34 |
| 8 | gl/200 SiO$_2$/8975 ZnO:Al | 1.5 × 10$^{21}$ | 100 | 0.036 | 74 | 40 | 34 |
| 9 | gl/200 SiO$_2$/3250 ZnO:Al/200 SnO$_2$ | 1.5 × 10$^{21}$ | 30 | <0.10 | 73 | 40 | 33 |
| 10 | gl/200 SiO$_2$/3250 ZnO:Al/200 SiO$_2$ | 1.5 × 10$^{21}$ | 30 | <0.10 | 74 | 40 | 34 |
| 11 | gl/200 SiO$_2$/2350 ZnO:Al/3000 SnO$_2$:F | 1.5 × 10$^{21}$ | 30 | <0.10 | 74 | 40 | 33 |
| 12 | gl/200 SnO$_2$/2920 ZnO:Al/200 SnO$_2$ | 1.5 × 10$^{21}$ | 30 | <0.10 | 74 | 40 | 33 |
| 13 | gl/160 SnO$_2$/100 SiO$_2$ 3250 ZnO:Al | 1.5 × 10$^{21}$ | 30 | <0.10 | 73 | 40 | 33 |
| 14 | gl/160 SnO$_2$/330 SiO$_2$/3500 ZnO:Al | 1.5 × 10$^{21}$ | 30 | <0.10 | 74 | 40 | 34 |
| 15 | gl/240 SnO$_2$/220 SiO$_2$/3250 ZnO:Al/200 SnO$_2$ | 1.5 × 10$^{21}$ | 30 | <0.10 | 72 | 40 | 32 |

Examples 16-23 were modeled on much the same basis as Examples 1-15, except that Examples 16-23 represent an insulated glass unit, as elsewhere defined herein, formed from two sheets of glass. The inventive coating stack was projected to be located on the so-called #2 surface; that is, on the major surface of the outboard glass sheet which faces the air space between the two glass sheets. The gap between the glass sheets was 12 mm, and the space was filled with air.

The electrical and optical properties of conductive materials can be characterized by $N_e$, the concentration of free electrons in the material, and $\mu$, the mobility of free electrons in the material. The solar selectivity of the coating stacks described herein depends primarily on the concentration of free electrons in the doped ZnO layer. As shown by Examples 2-4 in Table 1, the required solar selectivity can be achieved by using highly doped zinc oxide, where "highly-doped" refers to an electron concentration greater than $1.0 \times 10^{21}$ electrons/cm$^3$. By comparison, Example 1 shows that doped ZnO having an electron concentration of only $1.0 \times 10^{21}$ electrons/cm$^3$ results in a $T_{vis}$ (69%) that just meets the target value ($\geqq 69\%$). The solar selectivity of the coating stacks described herein also depends on the electron mobility in the doped ZnO layer. As shown by Examples 3 and 6-8 in Table 1, the required solar selectivity can be achieved by using highly doped zinc oxide with an electron mobility in the range of 15-100 cm$^2$/V-s. By way of comparison, Example 5 shows that doped ZnO with an electron mobility of 10 results in a $T_{vis}$ (69%) that just meets the target value ($\geqq 69\%$).

Examples 9 and 10 demonstrate that a thin protective overcoat, on the order of 200-300 Å of, for example SnO$_2$ or SiO$_2$, does not substantially alter the solar performance of the film stack. $T_{vis}$ and $T_{sol}$ remain above the desired levels of 69% and only slightly greater than 40%, respectively.

Example 11 demonstrates that a thicker doped overcoat (3000 Å fluorine doped tin oxide) does not seem to adversely affect the solar performance of the film stack, as both $T_{vis}$ and $T_{sol}$ are within the targeted levels of $\geqq 69\%$ and <41%, respectively. The applicants believe that utilization of an overcoat of the type modeled in Example 11 may provide lower emissivity and more nearly neutral color.

Example 12 shows that underlayers beside SiO$_2$, for example SnO$_2$, may be utilized in the subject film stack while maintaining desired levels of $T_{vis}$ and $T_{sol}$. Examples 13-15 show utilization of optional multi-layer color suppression interlayers which provide desired neutral color of transmitted light while, once again, maintaining desired levels of $T_{vis}$ and $T_{sol}$.

Table 2 shows the results of modeling of insulated glass (IG) units, the structure of which has been previously described herein. The solar performance of the subject IG units consistently exhibit properties at, or above, desired levels, in particular, $T_{vis} \geqq 62\%$, solar heat gain coefficient (SHGC) $\geqq 0.40$ and U-value <0.35, notwithstanding significant variations in the thickness of the doped zinc oxide coating. Emissivity is also, generally, less than 0.2, and for some examples, <0.1.

TABLE 2

| Ex. | Film stack | $N_e$ (cm$^{-3}$) | $\mu$ (cm$^2$/V-s) | $\epsilon_h$ | $T_{vis}$ | SHGC | U-value |
|---|---|---|---|---|---|---|---|
| 16 | gl/200 SiO$_2$/6900 ZnO:Al | $1.0 \times 10^{21}$ | 30 | 0.118 | 61 | 41 | 0.32 |
| 17 | gl/200 SiO$_2$/4340 ZnO:Al | $1.25 \times 10^{21}$ | 30 | 0.10 | 63 | 41 | 0.31 |
| 18 | gl/200 SiO$_2$/3250 ZnO:Al | $1.5 \times 10^{21}$ | 30 | 0.096 | 65 | 41 | 0.31 |
| 19 | gl/200 SiO$_2$/1875 ZnO:Al | $2.0 \times 10^{21}$ | 30 | 0.081 | 67 | 40 | 0.31 |
| 20 | gl/200 SiO$_2$/1575 ZnO:Al | $1.5 \times 10^{21}$ | 10 | 0.20 | 61 | 42 | 0.34 |
| 21 | gl/200 SiO$_2$/1960 ZnO:Al | $1.5 \times 10^{21}$ | 15 | 0.14 | 62 | 41 | 0.32 |
| 22 | gl/200 SiO$_2$/4300 ZnO:Al | $1.5 \times 10^{21}$ | 45 | 0.07 | 66 | 40 | 0.30 |
| 23 | gl/200 SiO$_2$/8975 ZnO:Al | $1.5 \times 10^{21}$ | 100 | 0.036 | 67 | 40 | 0.29 |

Predictive Examples 24-31 and 32-35

Examples 24-31, as shown in Table 3, were modeled utilizing input parameters substantially similar to Examples 1-15. The substrate thickness was 3 mm rather than 6 mm, however.

Similarly, Examples 32-35 were modeled as IG units substantially similar to those modeled in Examples 16-23. The thickness of both sheets of glass was, however, 3 mm and the gap therebetween was 6 mm, rather than 12 mm.

TABLE 3

| Ex. | Film stack | $N_e$ (cm$^{-3}$) | $\mu$ (cm$^2$/V-s) | $\epsilon_h$ | $T_{vis}$ | $T_{sol}$ | Solar Selectivity |
|---|---|---|---|---|---|---|---|
| 24 | gl/200 SiO$_2$/8200 ZnO:Al | $1.0 \times 10^{21}$ | 30 | 0.118 | 68 | 40 | 28 |
| 25 | gl/200 SiO$_2$/5160 ZnO:Al | $1.25 \times 10^{21}$ | 30 | 0.10 | 70 | 40 | 30 |
| 26 | gl/200 SiO$_2$/4040 ZnO:Al | $1.5 \times 10^{21}$ | 30 | 0.096 | 73 | 40 | 33 |
| 27 | gl/200 SiO$_2$/2150 ZnO:Al | $2.0 \times 10^{21}$ | 30 | 0.081 | 77 | 40 | 37 |
| 28 | gl/200 SiO$_2$/4010 ZnO:Al | $1.5 \times 10^{21}$ | 30 | <0.10 | 73 | 40 | 33 |
| 29 | gl/200 SiO$_2$/3660 ZnO:Al/200 SnO$_2$ | $1.5 \times 10^{21}$ | 30 | <0.10 | 71 | 40 | 31 |
| 30 | gl/200 SiO$_2$/3010 ZnO:Al/3000 SnO$_2$:F | $1.5 \times 10^{21}$ | 30 | <0.10 | 72 | 40 | 33 |
| 31 | gl/200 SnO$_2$/180 SiO$_2$/4040 ZnO:Al | $1.5 \times 10^{21}$ | 30 | <0.10 | 73 | 40 | 33 |

TABLE 4

| Ex. | Film stack | $N_e$ (cm$^{-3}$) | $\mu$ (cm$^2$/V-s) | $\epsilon_h$ | $T_{vis}$ | SHGC | U-value |
|---|---|---|---|---|---|---|---|
| 32 | gl/200 SiO$_2$/8200 ZnO:Al | $1.0 \times 10^{21}$ | 30 | 0.118 | 60 | 41 | 0.32 |
| 33 | gl/200 SiO$_2$/5160 ZnO:Al | $1.25 \times 10^{21}$ | 30 | 0.10 | 63 | 41 | 0.32 |
| 34 | gl/200 SiO$_2$/4040 ZnO:Al | $1.5 \times 10^{21}$ | 30 | 0.096 | 65 | 40 | 0.31 |
| 35 | gl/200 SiO$_2$/2150 ZnO:Al | $2.0 \times 10^{21}$ | 30 | 0.081 | 69 | 40 | 0.31 |

As can be observed from reviewing Table 3, with similar thicknesses of highly doped zinc oxide on thinner glass, it is still possible to maintain a $T_{sol}$ of 40, and a solar selectivity >28, although the preferred solar selectivity of 33 is more difficult to achieve.

Examples 32-35, displayed in Table 4, demonstrate that it is also possible to meet the desired solar performance levels for an IG unit utilizing 3 mm glass, namely $T_{vis}$ >62, SHGC $\geq 0.40$ and U-value $\leq 0.35$.

In accordance with the provisions of the patent statutes, the present invention has been described in what is considered to represent its preferred embodiment. However, it should be noted that the invention can be practiced otherwise than as specifically illustrated and described without departing from its spirit and scope. For example, other coating methods, such as sputtering, may also be utilized to form the solar control coating of the present invention.

What is claimed is:

1. A coated glass article comprising:
   a glass substrate;
   a coating of doped zinc oxide having a free electron concentration $\geq 1.0 \times 10^{21}$ cm$^{-3}$ deposited over the glass substrate; and
   a protective coating deposited over the zinc oxide coating;
   wherein the thicknesses of the coatings are selected so that the coated glass article exhibits a difference between visible light transmittance (Illuminant C) and total solar energy transmittance, integrated with an air mass 1.5 on a clear glass substrate having a nominal 6 mm thickness, to provide a solar selectivity of 28 or more and an emissivity <0.15.

2. The coated glass article defined in claim 1, wherein the solar selectivity of the doped zinc oxide coating is 33 or more.

3. The coated glass article defined in claim 1, wherein the doped zinc oxide coating has been deposited at a temperature of 500°-700° C.

4. The coated glass article defined in claim 1, wherein the protective coating is comprised of a metal oxide selected from the group consisting of tin oxide, silicon dioxide, aluminum oxide, titanium dioxide, niobium oxide, and zirconium oxide.

5. The coated glass article defined in claim 4, wherein the protective coating is a doped conductive coating.

6. The coated glass article defined in claim 1, wherein the doped zinc oxide coating has a thickness of $\geq 1600$ Å and $\leq 9000$ Å.

7. The coated glass article defined in claim 1, wherein the protective coating has a thickness of 1000 Å or less.

8. The coated glass article defined in claim 1, wherein the protective coating has a thickness of 250 Å or less.

9. The coated glass article defined in claim 1, wherein the dopant of the zinc oxide coating is at least one chosen from the group consisting of aluminum, gallium, indium and boron.

10. The coated glass article defined in claim 1, wherein the visible light transmittance of the coated glass article is $\geq 69\%$.

11. The coated glass article defined in claim 1, wherein the visible light transmittance of the coated glass article is $\geq 73\%$.

12. The coated glass article defined in claim 1, wherein the total solar energy transmittance of the coated glass article is <41%.

13. The coated glass article of claim 1, wherein a color suppression interlayer is formed over the glass substrate, the color suppression interlayer being formed of two coatings.

14. The coated glass article defined in claim 1, wherein the coatings are pyrolytic.

15. A coated glass article comprising:
   a glass substrate;
   a coating of doped zinc oxide deposited over the glass substrate by chemical vapor deposition;
   a protective metal oxide coating deposited over the doped zinc oxide coating, the zinc oxide coating having an electron concentration $\geq 1.0 \times 10^{21}$ electrons (cm$^{-3}$) and an electron mobility of 10 cm$^2$/V-s or more; and
   wherein the thicknesses of the coatings are selected so that the coated glass article exhibits a difference between visible light transmittance (Illuminant C) and total solar energy transmittance, integrated with an air mass 1.5 on a clear glass substrate having a nominal 6 mm thickness, to provide a solar selectivity of 28 or more.

* * * * *